United States Patent
Horn et al.

(10) Patent No.: US 7,162,582 B2
(45) Date of Patent: Jan. 9, 2007

(54) CACHING IN A VIRTUALIZATION SYSTEM

(75) Inventors: Robert L. Horn, Yorba Linda, CA (US); Virgil V. Wilkins, Perris, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 276 days.

(21) Appl. No.: 10/713,190

(22) Filed: Nov. 17, 2003

(65) Prior Publication Data

US 2004/0098538 A1   May 20, 2004

Related U.S. Application Data

(60) Provisional application No. 60/505,023, filed on Sep. 24, 2003, provisional application No. 60/426,822, filed on Nov. 18, 2002.

(51) Int. Cl.
*G06F 12/00* (2006.01)

(52) U.S. Cl. .................................... 711/118
(58) Field of Classification Search ................ 711/114, 711/118; 710/300; 707/103
See application file for complete search history.

(56) References Cited

U.S. PATENT DOCUMENTS

| | | | | |
|---|---|---|---|---|
| 5,333,277 A | * | 7/1994 | Searls | ...................... 710/300 |
| 5,615,352 A | * | 3/1997 | Jacobson et al. | ........... 711/114 |
| 6,128,623 A | * | 10/2000 | Mattis et al. | ........... 707/103 R |
| 6,195,730 B1 | | 2/2001 | West | |
| 6,389,432 B1 | | 5/2002 | Pothapragada et al. | |
| 6,412,045 B1 | | 6/2002 | DeKoning et al. | |
| 6,421,711 B1 | | 7/2002 | Blumenau et al. | |
| 6,446,161 B1 | | 9/2002 | Yamamoto et al. | |
| 6,446,175 B1 | | 9/2002 | West et al. | |
| 6,651,137 B1 | * | 11/2003 | Baek et al. | ................. 711/114 |
| 2003/0084252 A1 | | 5/2003 | Talagala | |
| 2003/0172149 A1 | | 9/2003 | Edsall et al. | |

\* cited by examiner

*Primary Examiner*—Pierre Bataille
*Assistant Examiner*—Paul Schlie
(74) *Attorney, Agent, or Firm*—Dickstein Shapiro LLP

(57) ABSTRACT

A virtualizer module/element and a networked storage controller architecture with a virtualization layer that includes virtualizer modules. The virtualizer modules contain storage controller functionality as well as a cache subsystem. The virtualizer module processes primary data commands received from a host processor to determine if the cache subsystem of the virtualizer can service the data request or if it should be sent to a command mapper to retrieve the data from a downstream storage element. The cache subsystem of the virtualizer module thus enables reduced latency in the networked storage system as well as better management of storage devices and resources. The virtualizer module also facilitates predictive reads and read-ahead operations as well as coalesced write requests to a given storage device in order to increase system performance and storage device longevity.

16 Claims, 4 Drawing Sheets

CACHING IN A VIRTUALIZATION SYSTEM

CROSS-REFERENCE TO RELATED APPLICATIONS

This application claims the benefit of U.S. Provisional Application No. 60/426,822, filed Nov. 18, 2002, and U.S. Provisional Application No. 60/505,023, filed Sep. 24, 2003, the entire contents of which are incorporated herein by reference.

FIELD OF THE INVENTION

The present invention relates to a networked storage system with virtualization elements that contain cache.

BACKGROUND OF THE INVENTION

With the accelerating growth of Internet and intranet communication, high-bandwidth applications (such as streaming video), and large information databases, the need for networked storage systems has increased dramatically. One networked storage system architecture, the storage area network (SAN), provides a highly scalable, flexible topology that many experts are calling the future of enterprise storage.

In a SAN, users access the data on the storage elements through host ports. The host ports may be located in close proximity to the storage elements or they may be several miles away. In either case, the connection between the storage element controllers and the host ports is known as the SAN fabric. This fabric is often composed of a fiber channel interconnect, although, it may be any type of serial interconnect.

The storage elements used in SANs are often hard disk drives. Unfortunately, when a drive fails, the data stored on the drive is inaccessible. In a system where access to data is imperative, there must be a backup system. Most backup systems today involve storing the data on multiple disk drives so that, if one drive fails, another drive that contains a copy of the data is available. These multiple disk drives are known as redundant arrays of independent disks (RAIDs). The addition of RAIDs and their associated RAID controllers make a SAN more reliable and fault tolerant. Because of its inherent advantages, RAID has quickly become an industry standard. However, there are still large groups of disk drives available for networked storage without the RAID features. These groups of disk drives are now referred to as "just a bunch of disks" (JBOD) to distinguish them from their RAID counterparts.

Storage systems often employ the use of several storage devices to redundantly store data (e.g., mirroring) in case one or more storage devices fail. Mirroring is a form of RAID known as RAID 1. Mirroring is the process by which data stored on one drive is copied or mirrored to another drive; therefore, the two drives are exact copies or mirrors of each other. In a like manner, several storage devices may be used in parallel to increase performance (striping). Striping is another aspect of RAID and is the process of breaking up consecutive lines of data and writing them on more than one drive. When the data needs to be accessed, all of the drives that contain a piece of the data may simultaneously send their portion to the requesting controller. The controller then arranges the data from each of the drives in order and sends it to the requesting host. However, it is inefficient for hosts to be required to keep track of the various logical and physical combinations, so a layer of abstraction is needed. This layer of abstraction is the concept of storage virtualization. Storage virtualization hides the internal functions of a storage subsystem or service from applications, computer servers, or general network resources for the purpose of enabling application and network independence from the management of storage or data. In a virtualized SAN architecture, hosts request access to virtual volumes, which may consist of any number of storage elements controlled by any number of RAID controllers. This allows for much greater flexibility in storage resource management, and allows volume size, performance, and reliability to change as users' needs change.

The virtualization layer is usually formed of virtualizer elements whose function is to translate virtual volume requests into logical volume requests and send those requests to the corresponding storage controllers. This process, of course, takes some amount of overhead in the form of processing time. Processing cycles are required to translate the virtual addresses to their logical forms. Virtualizers also account for increased system latency because they constitute another layer of additional processing.

Still other problems with today's virtualizers include excessive interconnect traffic. Interconnect traffic includes data flowing to and from the disks, controllers, and virtualizers. In some cases, excessive interconnect traffic may occur when redundant data is sent over the interconnect multiple times. For example, a storage controller may send data to a disk it controls and send the same data to another controller that, in turn, sends the data to a disk under its control. The same data has now traversed the interconnect twice. Excessive interconnect traffic may limit the interconnect bandwidth and cause system performance to decrease. Thus there is a need for improved virtualization implementation in a networked storage system that reduces command latencies.

An example of a method for improving command latencies is described in U.S. Application Publication No. 2003/0084252, entitled, "Disk Drive Employing Adaptive Flushing of a Write Cache." The '252 application describes a method embodied as software or firmware code that permits the adaptation of disk drives employing write-back caching to reduce the possibility of lost data from the write cache. In one embodiment, the method is integrated with the host operating system software employed by a host computer coupled to the disk drive. The method issues write requests to the disk drive as it receives them from the applications running on the host computer. The disk drive processes the issued requests as it is designed to, using write-back caching techniques. After each request is cached, the disk drive controller acknowledges the write request back to the host. The host delays communicating the acknowledgements back to their originating applications until the data has been actually written to the disk media. Because write-back caching does not commit cached requests to disk on a regular basis, the host software simply forces the disk drive to execute cached write requests on a regular basis using a CACHE_FLUSH command. The disk drive employs standard throughput optimization techniques to reduce the overall latency of the disk accesses. When the rate of the request stream is low, the host simply issues a flush command after issuing each write request to the drive. As the rate of the request stream increases, the host lets the requests pool in the cache rather than at the host. It then issues a flush command when the pool size reaches a number where the incremental reduction in throughput to the disk media during the flush no longer offsets the incremental increase in request latency due to the pooling time. When the flush is complete, the disk drive notifies the host, and the host releases the acknowledgements of all of the pooled requests to their originating applications.

The system described in the '252 application focuses on reducing latency and maintaining data integrity in a networked storage system, such as a SAN for write commands and write data. Although the '252 application describes a method of using write caching and acknowledging back to the host for increased system performance, it does not describe how to increase SAN performance for read commands. Furthermore, it does not describe a method for using cache in a networked storage virtualization layer. The system described in the '252 application also fails to provide a description of the virtualization process and how it may be produced or created.

SUMMARY OF THE INVENTION

The present invention is a scalable networked storage controller architecture that provides virtualization with cache for performing predictive reads and coalesced writes. The invention also provides an architecture that promotes reduction in latency and increased read-ahead efficiency in a storage area networks (SAN).

The present invention is a virtualizer and a method for operating the virtualizer. The virtualizer includes a target port for receiving primary data commands from a host system, a task manager for accepting primary data commands from the target port and coordinating execution of the primary data commands, a cache subsystem for receiving data requests corresponding to the primary data commands and reconciling the data requests, a command mapper for parsing the data requests into at least one secondary data command, and an initiator port for accepting the at least one secondary data command and forwarding the at least one secondary data command to a downstream data storage element.

The method of operating the virtualizer includes the steps of receiving, via a target port, a primary data command from an external host system; forwarding the primary data command to a task manager; coordinating, in the task manager, execution of the primary data command at one of a host level and a volume-task set level; forwarding a data request corresponding to the primary data command to a cache subsystem, the cache subsystem reconciling the data request with a current state of the cache subsystem; retrieving data from the cache subsystem and forwarding the retrieved data to the target port, if the cache subsystem has the requested data; forwarding the data request to a command mapper, if the cache subsystem does not have the requested data; parsing of the data request into at least one secondary data command; forwarding the secondary data command to an initiator port; and forwarding the secondary data command to a downstream data storage element.

Therefore, it is an object of the present invention to reduce command latency and increase command throughput in a virtualization network through the incorporation of cache in a virtualizer.

It is another object of the invention to provide a virtualizer with the ability to perform predictive reads and coalesced writes through the incorporation of cache.

It is yet another object of this invention to enable RAID and/or JBOD controller functionality through the incorporation of cache in a virtualizer.

It is yet another object of this invention to enable RAID and/or JBOD controller functionality through the incorporation of cache in a virtualizer with reduction in latency.

It is yet another object of this invention to enable RAID and/or JBOD controller functionality through the incorporation of cache in a virtualizer with the ability to dictate predictive reads to the disk drives.

It is yet another object of this invention to enable RAID and/or JBOD controller functionality through the incorporation of cache in a virtualizer with the ability to perform coalesced writes.

It is yet another object of this invention to enable RAID and/or JBOD controller functionality through the incorporation of cache in a virtualizer with greater read-ahead efficiency.

DETAILED DESCRIPTION OF THE INVENTION

Figure 1:
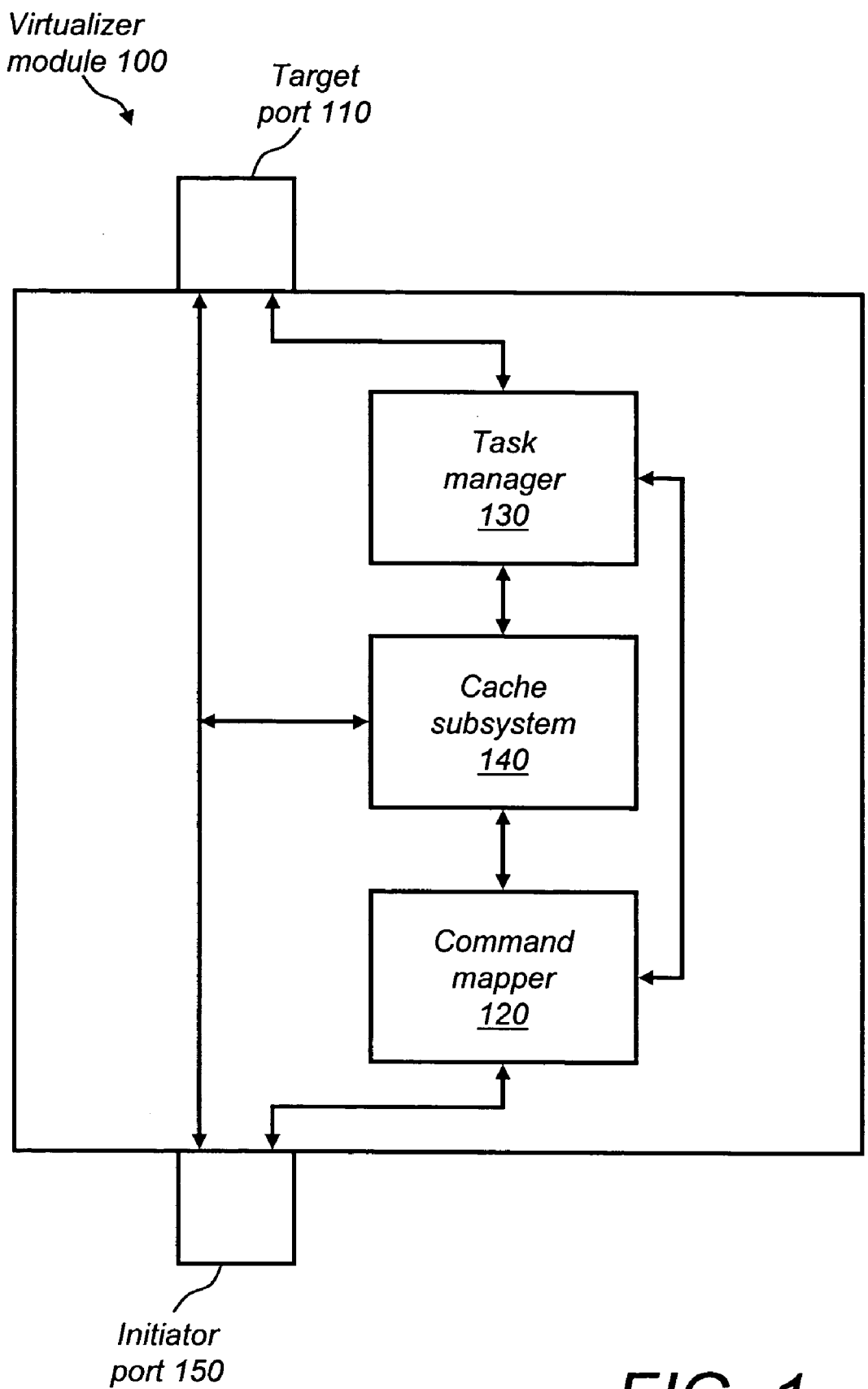
FIG. 1 shows a block diagram of a virtualizer module that contains cache.

FIG. 1 depicts a virtualizer module 100 in accordance with the invention. Virtualizer module 100 includes a target port 110, a command mapper 120, a task manager 130, a cache subsystem 140, and an initiator port 150.

The virtualizer module of the present invention may be implemented in hardware, software, firmware, Application Specification Integrated Circuits (ASICs), Field Programmable Gate Arrays (FPGAs), Reduced Instruction Set Computers (RISCs) or any equivalent or combination thereof.

The elements of virtualizer module 100 are functionally connected as follows: Target port 110 is the data and control interface to an external host system (not shown). Within virtualizer module 100, target port 110 is connected to task manager 130 and cache subsystem 140 through bi-directional busses. Cache subsystem 140 is a standard computer memory device that contains sub-components such as a prediction unit (not shown), a prefetch unit (not shown), a cache controller (not shown), and cache memory (not shown), as is well known to those skilled in the art. Task manager 130 is a digital control function that processes primary data commands received from an external host system and communicates with cache subsystem 140. Cache subsystem 140 is further connected within virtualizer module 100 to command mapper 120, which forwards additional/secondary data commands to initiator port 150. Initiator port 150 is connected within virtualizer module 100 to command mapper 120 and cache subsystem 140. Initiator port 150 is a physical port that externally connects to data storage elements (not shown) or to data storage element controllers (not shown) for the purpose of information storage and retrieval. Target port 110 and initiator port 150 are shown in FIG. 1 as two physically distinct ports; however, they can, in fact, be the same physical port. It should be noted that the virtualizer module 100 is intended to illustrate a single, simple implementation of the invention. Those skilled in the art will recognize that a broad variety of other implementations, in accordance with the present invention, are also possible. For example, a virtualizer module may be equipped with multiple initiator ports (not shown) for the purpose of interfacing to multiple downstream data storage elements.

With reference to FIG. 1, the essential function of virtualizer module 100 is generally described as follows: Target port 110 receives primary data command from an external host system (not shown) and forwards it to task manager 130. Task manager 130 coordinates the primary command execution at the host or volume-task set level. Task manager 130 then forwards user data requests directly to cache subsystem 140, which reconciles the user data request with the current cache state. If cache subsystem 140 can service the data request, cache data passes directly from cache subsystem 140 to target port 110. User data requests that cannot be serviced by the current cache state are forwarded by task manager 130 directly to command mapper 120. Command mapper 120 parses the user data request into one or more secondary data commands and forwards the secondary data commands directly to initiator port 150. Initiator port 150 then forwards these secondary data commands to downstream storage element/sub systems.

Figure 2:
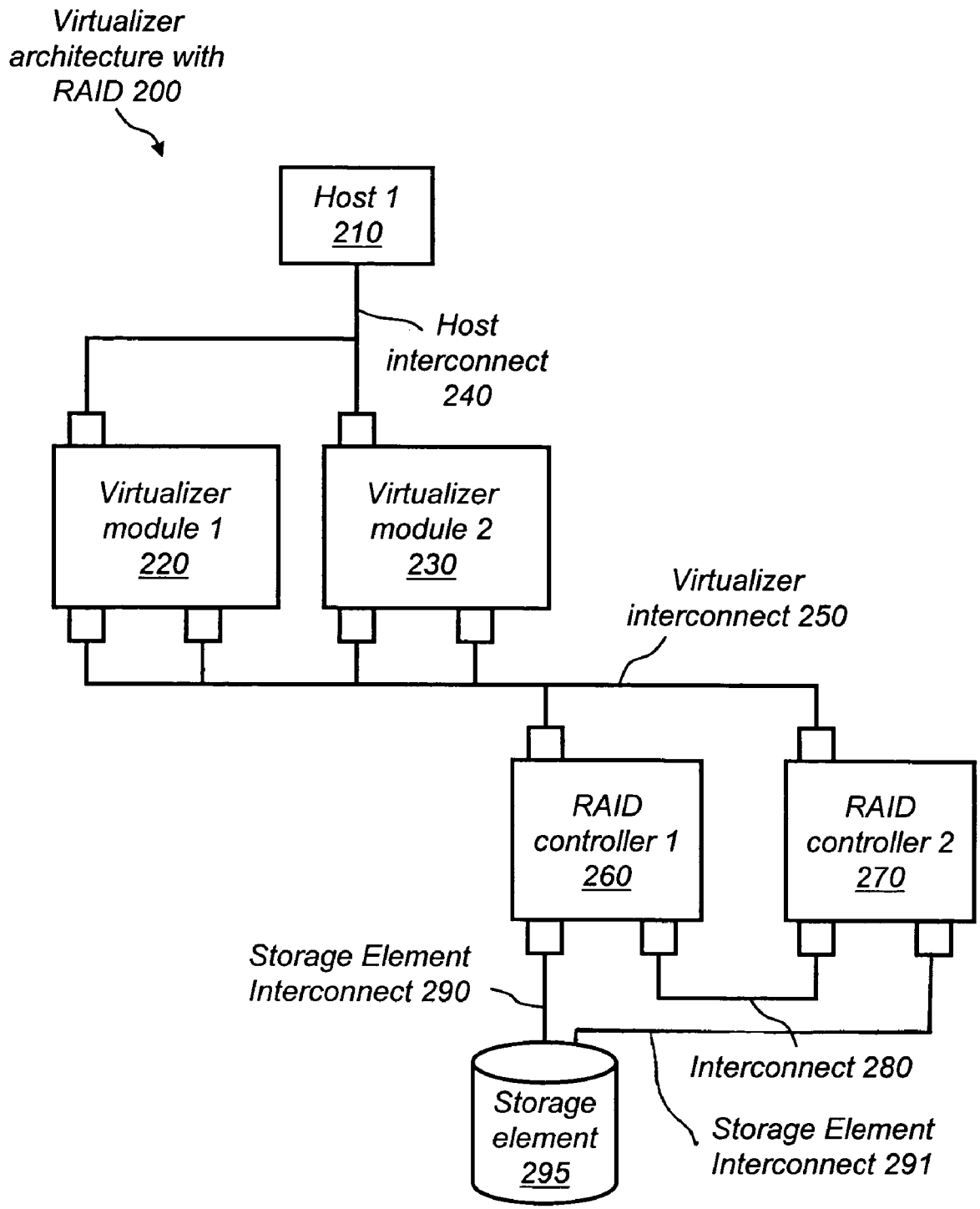
FIG. 2 shows a block diagram of a virtualizer architecture with RAID controllers.

FIG. 2 is a virtualizer architecture with RAID 200 that includes a host 1 210 connected to a virtualizer module 1 220 and a virtualizer module 2 230 through a host interconnect 240. Virtualizer module 1 220 is also coupled to virtualizer module 2 230 via virtualizer interconnect 250. Virtualizer module 2 230 is further coupled to a host 1 210 via host interconnect 240 and a RAID controller 1 260 via virtualizer interconnect 250. RAID controller 1 260 is further coupled to a storage element 295 and a RAID controller 2 270. RAID controller 1 260 and storage element 295 communicate via a storage element interconnect 290. RAID controller 2 270 is similarly connected to storage element 295 via another storage element interconnect 291. RAID controller 1 260 and RAID controller 2 270 communicate via an interconnect 280. The use of multiple RAID controllers 260, 270 enhances system reliability. For example, host 1 210 issues a write command for a volume controlled by RAID controller 1 260 that resides on storage element 295. Since RAID controller 1 260 is redundantly paired with RAID controller 2 270, if RAID controller 1 260 fails, RAID controller 2 270 may take over control of storage element 295 because both RAID controllers 260, 270 are coupled to the storage element 295. Virtualizer architecture with RAID 200 reduces latency in the system because it reduces the number of steps required to give command completion status to the host. Virtualizer module 2 230 receives the write command from host 1 210. Virtualizer module 2 230 accepts the write data, stores it into its cache, and copies the data into the cache of virtualizer module 1 220 via virtualizer interconnect 250. Virtualizer module 1 220 acknowledges to virtualizer module 2 230 that the write data has been stored in cache. Virtualizer module 2 230 then acknowledges the write to host 1 210. At a later time, virtualizer module 2 230 forwards the write data with a write command to RAID controller 1 260. When the data has been written, RAID controller 1 260 sends an acknowledgement back to virtualizer module 2 230.

In contrast, a traditional system that contains no cache in the virtualizer modules must accept the write command and data from host 1 210 and forward the command and write data to RAID controller 1 260. RAID controller 1 260 then copies the data to RAID controller 2 270. RAID controller 2 270 acknowledges to RAID controller 1 260 that the data is copied. RAID controller 1 260 further acknowledges the command to virtualizer module 2 230, which, in turn, acknowledges the write completion to host 1 210. In this case, the data is transferred from virtualizer module 2 230 to RAID controller 1 260 to RAID controller 2 270. In the present invention, the data is transferred using virtualizer architecture with RAID 200. Virtualizer architecture with RAID 200 thus provides less latency than conventional architectures because conventional systems require the RAID controller to decode the command, accept the command, mirror the command, and then acknowledge that it has received and mirrored the command back to the virtualizer. In turn, the virtualizer then acknowledges to the host that the command is complete. In contrast, virtualizer architecture with RAID 200 stores the command in its cache, mirrors the cache and acknowledges to the host that the command is complete without introducing latency from the RAID controller.

Figure 3:
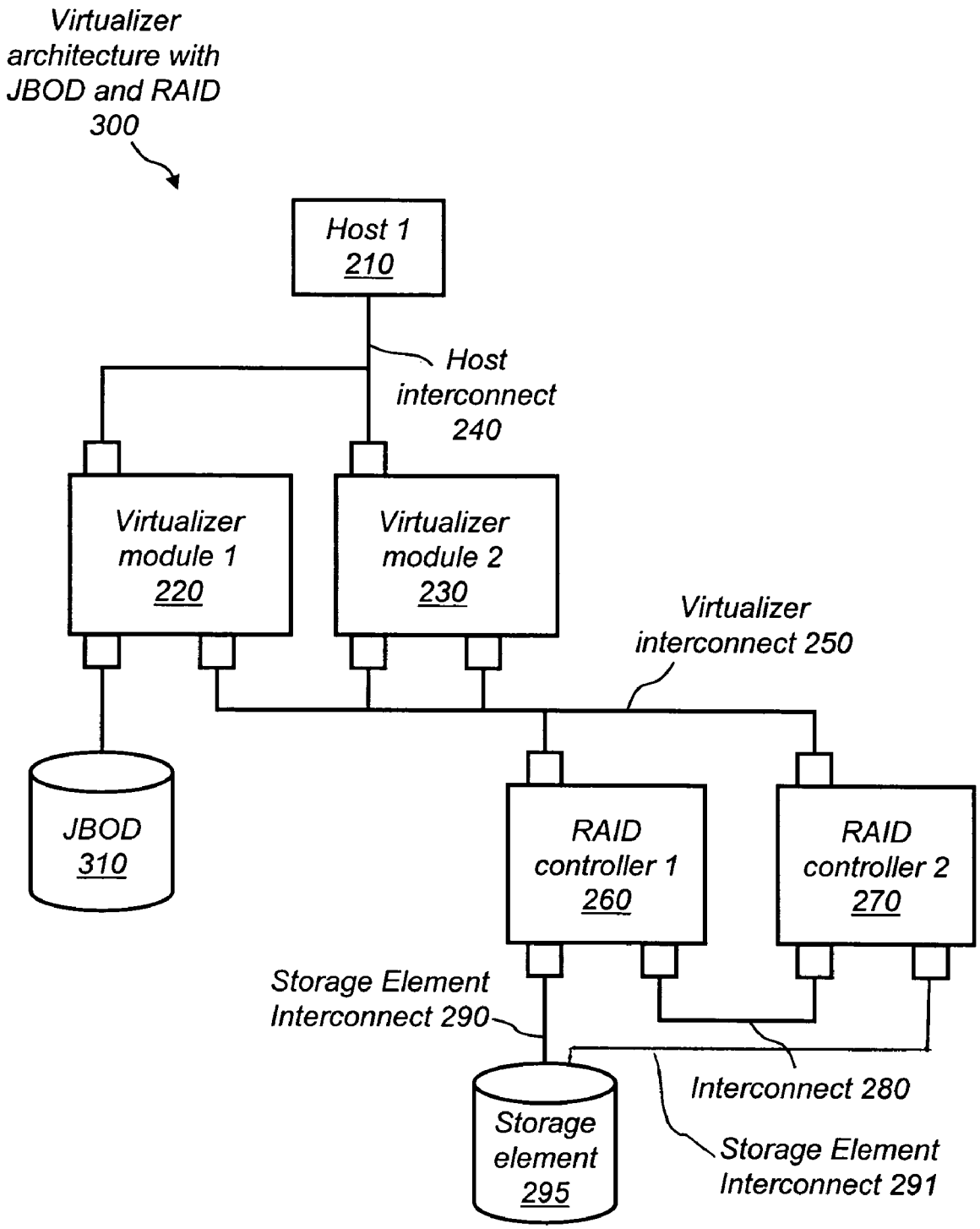
FIG. 3 illustrates a block diagram of a virtualizer architecture with a JBOD and a RAID.

FIG. 3 is a virtualizer architecture with JBOD and RAID 300 that includes the elements of virtualizer architecture with RAID 200 as well as a JBOD 310 coupled to virtualizer module 1 220. Virtualizer architecture with JBOD and RAID 300 allows for coalesced writes to JBOD 310. A coalesced write is simply the process of collecting multiple write requests to a group of sequential or nearly sequential logical block addresses (LBAs) so that the data may be written with a single write command to sequential LBAs. This process minimizes tracking and seeking motions performed by the head which, in turn, minimizes the time required to perform the writes as well as minimizing the physical head motion. Minimizing head motion increases the longevity of JBOD 310 and thus increases the mean time between failures (MTBF). The following is an example of a coalesced write. The example is used for illustrative purposes only and in no way limits the actual implementation of virtualizer architecture with JBOD and RAID 300. In this example, host 1 210 issues a write command to an LBA residing on JBOD 310. Virtualizer module 1 220 receives the command and data, and stores the write data in its own cache and in the cache of virtualizer module 2 230. Virtualizer module 220 then sends a write acknowledge back to host 1 210. Host 1 210 issues a read command from an address on storage element 295. Next, host 1 210 issues another write command to the next sequential LBA residing on JBOD 310. Virtualizer module 1 220 also stores this data in its own cache and in the cache of virtualizer module 2 230 and sends an acknowledge back to host 1 210. Host 1 210 then performs a write to storage element 295. Finally, host 1 210 sends a third write command to JBOD 310 via virtualizer module 1 220. This command and data are also stored in cache, and virtualizer module 220 acknowledges the command to host 1 210. The cache of virtualizer module 1 220 now holds the data for three write commands that are to be written to three consecutive LBAs on JBOD 310. Virtualizer module 1 220 creates a single write command from the three original write commands and sends the command and data to JBOD 310. JBOD 310 performs the three writes as a single write command and sends the complete acknowledgement to virtualizer module 1 220. The result is not only less wear and tear on the head of JBOD 310 but also in a reduction in latency. Using virtualizer architecture with JBOD and RAID 300, JBOD 310 finds the beginning LBA using a seek operation and performs the write for all three write requests. In a traditional system, JBOD 310 would need to locate three different LBAs, and then write three separate sets of data using multiple disk accesses at separate times.

Figure 4:
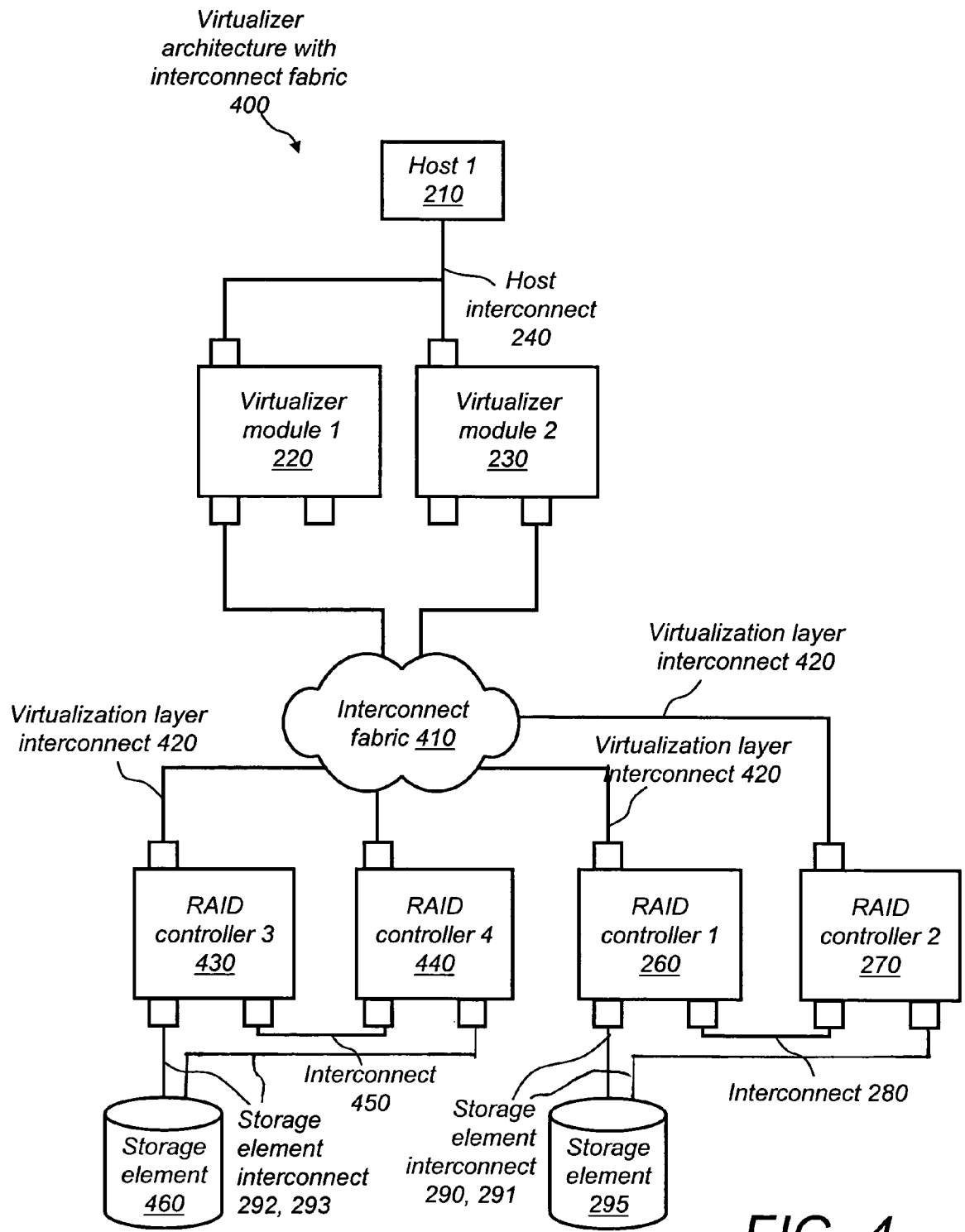
FIG. 4 is a block diagram of the virtualizer architecture with an interconnect fabric.

FIG. 4 is a virtualizer architecture with interconnect fabric 400. In this architecture, JBOD 310 is replaced with a RAID controller 3 430 mirrored with a RAID controller 4 440. RAID controller 3 430 controls a storage element 460 and is coupled to RAID controller 4 440 via an interconnect 450.

The RAID controllers are coupled to the virtualizer modules via an interconnect fabric 410 and a virtualization layer interconnect 420. The RAID controllers 260, 270, 430, 440 are respectively coupled to storage elements 295, 295, 460, 460 respectively via storage element interconnects 290, 291, 292, 293. The following example illustrates the advantages of cache in virtualizers for predictive read performance improvements. In this example, virtual volume 1 stripes a logical volume on storage element 460 controlled by RAID controller 3 430 and a logical volume on storage element 295 controlled by RAID controller 1 260. Virtualizer module 1 220 and virtualizer module 2 230 have read-caching and read-ahead functionality. Because of this added functionality in the virtualizers, the read-ahead function may be disabled in the RAID controllers. Virtualizer 1 220 may now perform read functions more efficiently because it, rather than the individual RAID controllers, has control over the read-ahead and read-caching operations. For example, host 1 210 issues a read command to virtualizer module 1 220 for virtual volume 1. Virtualization module 1 220 recognizes that virtual volume 1 includes a stripe across a logical volume residing on storage element 460 and a logical volume residing on storage element 295. For this example, a small portion of the data requested by host 1 210 resides at the end of the stripe on storage element 460 and the majority of the data resides in the stripe on storage element 295. Therefore, virtualizer module 1 220 issues a read command to RAID controller 3 430 for the data on storage element 460 and then issues either a larger command or a second and third command to RAID controller 1 260 for the rest of the data residing on storage element 295. In this manner, virtualizer module 1 220 has eliminated unnecessary read-ahead and read-caching that may have otherwise been performed by RAID controller 3 430. RAID controller 3 430 may have read-ahead data outside the stripe boundary, which would have been unnecessary and possibly detrimental to the life of storage element 460. Therefore, adding read-caching and read-ahead capability to the virtualizer modules improves the efficiency and the robustness of the overall system.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A virtualizer, comprising:
    a task manager for coordinating execution of primary data commands received from a host system;
    a cache subsystem coupled to said task manager within the virtualizer for receiving data requests corresponding to said primary data commands and reconciling said data requests to determine if the cache subsystem can service said data requests; and
    a command mapper coupled to said cache subsystem within the virtualizer for receiving data requests that cannot be serviced by the cache subsystem and parsing said data requests into at least one secondary data command to be sent to a downstream data storage element via a redundant array of independent disks (RAID) controller separate from the virtualizer.

2. The virtualizer according to claim 1, further comprising a target port for receiving said primary data commands from said host system.

3. The virtualizer according to claim 1, further comprising an initiator port for outputting said secondary data commands to said downstream data storage element.

4. The virtualizer according to claim 1, wherein said target port is coupled to said task manager and said cache subsystem.

5. The virtualizer according to claim 3, wherein said virtualizer has multiple ones of said initiator port for interfacing to multiple downstream data storage elements.

6. The virtualizer according to claim 1, wherein the RAID controller includes a cache subsystem separate from the cache subsystem of the virtualizer.

7. A method of operating a virtualizer, said method comprising:
    receiving a primary data command from an external host system;
    forwarding said primary data command to a task manager within the virtualizer;
    coordinating, in said task manager, execution of said primary data command;
    forwarding a data request corresponding to said primary data command from said task manager to a cache subsystem within the virtualizer said cache subsystem reconciling said data request to determine if the cache subsystem can service said data request;
    forwarding said data request from said task manager to a command mapper, if said cache subsystem does not have said requested data;
    parsing said data request in said command mapper into at least one secondary data command; and
    forwarding said secondary data command from said command mapper to a downstream data storage element via a redundant array of inexpensive disks (RAID) controller separate from the virtualizer.

8. A method of operating a virtualizer architecture, said method comprising:
    issuing a write data command for data on a volume of a data storage element, said data storage element coupled to a first of plurality of redundant arrays of independent disk (RAID) controllers;
    receiving said write data command, and data corresponding to said write data command, in a first virtualizer;
    storing said write data in a cache subsystem within said first virtualizer;
    copying said write data into a cache within a second virtualizer; and
    forwarding the write data with a write command from one of said first virtualizer and said second virtualizer to said first RAID controller, wherein
    said first RAID controller is separate from the first virtualizer and the second virtualizer.

9. A method of operating a virtualizer architecture, said method comprising:
    issuing a write data command from a host processor for data on a disk, said disk coupled to a first of a plurality of virtualizers;
    receiving said write data command, and write data corresponding to said write data command, in said first virtualizer;
    storing said write data in a cache subsystem within said first virtualizer;
    copying said write data into a cache within a second virtualizer; and
    forwarding the write data and a write command to said disk via a redundant array of inexpensive disks (RAID) controller separate from the first virtualizer and the second virtualizer.

10. The method according to claim 9, wherein said write command comprises a coalesced write to sequential logical block addresses (LBAs) of said disk.

11. A method of operating a virtualizer architecture, said method comprising:
- issuing, from a host processor, a primary read data command for data on volumes of multiple data storage elements, each of said data storage elements coupled to one of a plurality of redundant arrays of independent (RAID) controllers;
- receiving, in one of a plurality of virtualizers, said primary read data command;
- generating multiple secondary read data commands for said data stored on volumes of multiple data storage elements;
- forwarding said multiple secondary read data commands to said volumes of said multiple data storage elements;
- receiving, in said RAID controllers, said requested data from said volumes of multiple data storage elements via a storage interconnect;
- forwarding, from said RAID controllers, said requested data to said one virtualizer; and
- storing said requested data in a cache subsystem within said one virtualizer; and
- forwarding, from said cache subsystem within said one virtualizer, said requested data to said host processor, wherein
- at least one of the plurality of redundant arrays of independent (RAID) controllers are separate from said one virtualizer.

12. A virtualizer architecture, comprising:
- at least one host processor;
- a plurality of virtualizers for processing primary data commands from said at least one host processor, said plurality of virtualizers coupled to said at least one host processor via a host interconnect;
- a plurality of redundantly paired redundant arrays of independent disk (RAID) controllers separate from the plurality of virtualizers, the RAID controllers being coupled to said plurality of virtualizers via an interconnect fabric and a virtualization layer interconnect, each of said plurality of virtualizers including therein a cache memory subsystem for temporarily storing data associated with data access requests; and
- at least one data storage element coupled to one of said RAID controllers of each of said redundantly paired RAID controllers, each data storage element coupled to said one of said RAID controllers via a storage interconnect, each one of said pair of redundantly paired RAID controllers coupled to each other via an interconnect.

13. The virtualizer architecture according to claim 12, wherein said plurality of virtualizers have read-caching and read-ahead functionality.

14. The virtualizer according to claim 6, wherein the cache subsystem of the RAID controller is capable of servicing the secondary data request.

15. The virtualizer according to claim 6, wherein at least a function of the cache subsystem of the RAID subsystem is disabled.

16. The virtualizer according to claim 15, wherein the cache subsystem of the RAID controller is disabled.

* * * * *